J. SILVERSTEIN AND J. B. ROTHBERG.
SPECTACLES.
APPLICATION FILED SEPT. 24, 1919.

1,346,429. Patented July 13, 1920.

INVENTORS
Julius Silverstein and
Jacob B. Rothberg

ATTORNEY

UNITED STATES PATENT OFFICE.

JULIUS SILVERSTEIN AND JACOB B. ROTHBERG, OF NEW YORK, N. Y.

SPECTACLES.

1,346,429.  Specification of Letters Patent.  Patented July 13, 1920.

Application filed September 24, 1919. Serial No. 325,948.

*To all whom it may concern:*

Be it known that we, JULIUS SILVERSTEIN, a citizen of the United States, and resident of the borough of Manhattan, city, county, and State of New York, and JACOB B. ROTHBERG, a citizen of the United States, and resident of the borough of Manhattan, city, county, and State of New York, have invented certain new and useful Improvements in Spectacles, of which the following is a specification.

This invention relates to improvements in spectacles, and its principal object is to incorporate the advantages of bone, celluloid or a composition frame in a pair of spectacles in such a manner as to permit the use of such material in lieu of the usual metallic bridge-piece and temples.

Heretofore in the manufacture of spectacles it has become quite common to form the frames of bone, celluloid or a composition, as such material when used for the nose bridge and temples gives greater comfort to the wearer than frames of metal. The great objection to the frames of bone and similar material however, lies in the fact that when round lenses are used, the same frequently rotate out of focus when being cleaned, thereby materially affecting and sometimes completely destroying the sight of the user.

It is therefore an important object of this invention to provide bone or composition nose pieces and temples which are attached to the lenses in such a manner as to prevent any danger of them becoming useless or rotated out of focus.

A further object of the invention resides in the provision of a novel connection for the nose bridge to the lenses and for the temple pieces to the lenses.

With the above and other objects in view the invention consists in the novel construction, combination and arrangement of parts which will be fully set forth in the following specification claimed and illustrated in the accompanying drawings in which—

Figure 1:
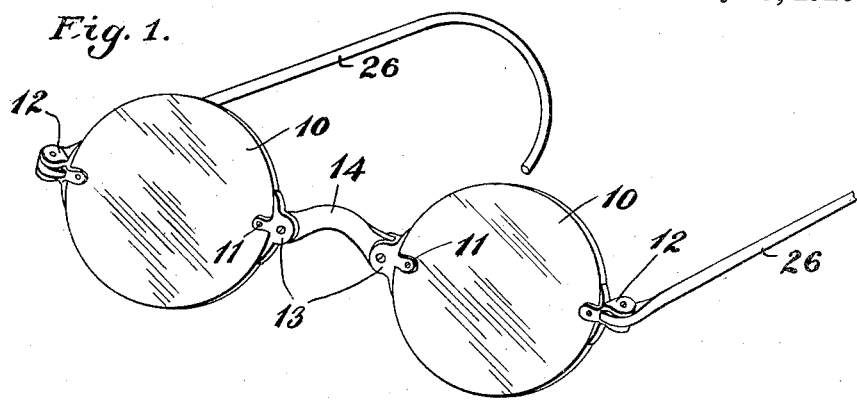
Figure 1, is a perspective view of a pair of spectacles constructed in accordance with this invention.
Figure 2:
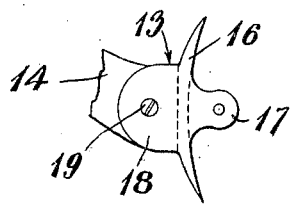
Fig. 2, is a side view of the nose bridge connection.
Figure 3:
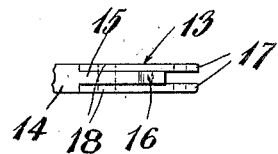
Fig. 3, is a top plan view of Fig. 2.
Figure 4:
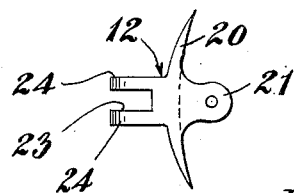
Fig. 4, is a side view of one of the temple connections.
Figure 5:
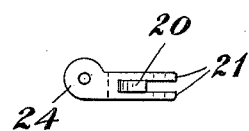
Fig. 5, is a top plan view of Fig. 4.

Referring to the drawings in detail, the numeral 10 designates the lenses of a pair of spectacles which may be of any preferred form, preferably round and provided at diametrically opposite points with apertures for the reception of the attaching screws for the temple and nose bridge connections designated respectively by the numerals 12 and 13. The bridge piece is designated by the numeral 14 and consists of a bowed body provided at each end with a reduced tongue 15 which is adapted to be received in the bifurcated portion of the nose bridge connection.

Each nose bridge connection consists of a body portion or saddle 16 which is curved to fit over the edge of the lens in the manner illustrated in Fig. 1, and formed on the central portion of said body are ears 17 which extend outwardly therefrom in parallel relation and are adapted to receive one of the lenses 10. Extending outwardly from the body and in spaced parallel relation thereto, in a direction opposite that of the ears 17, are parallel extensions 18 between which one of the tongues 15 of the nose piece is connected by a suitable securing means 19, which may consist of one or more screws, rivets or the like.

It will be seen that the flat ends of the tongues 15 will engage the flattened portions of the saddles 16 and any rocking movement between the lenses and the nose bridge will be avoided.

It will thus be seen that the advantages and comfort of a bone, celluloid or composition nose piece may be had, yet danger of rotation of the lenses with relation to each other is overcome.

In order to permit the use of bone, celluloid or similar temples, the temple connections 12 are provided, and each consists of a main body or saddle portion 20 which is curved to fit the edge of the lens and is provided with ears 21 which operate in the manner of the ears 17 and partially embrace the lens.

Figure 6:
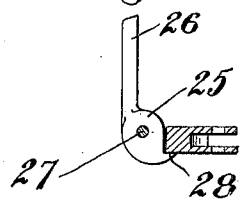
Fig. 6, is a horizontal sectional view through one of the temple connections illustrating in detail one of the temples and its stop.

Extending from the central portion of the body or saddle 20 in a direction opposite the ears 21, is an extension which is slotted as at 23 to provide the pivot ears 24 for the reception of the barrel 25 of a temple 26 which is pivoted as at 27 between said ears 24. The barrel 25 is provided with a stop 28 arranged to limit the outwardly swinging movement of the temple and in such a manner that when the temple has reached its outermost limit of movement the stop will engage the forward or outer face of the extension 22 as illustrated in Fig. 6.

From the foregoing it will be obvious that a simple and efficient means is provided for combining the advantages of the so-called shell-rimmed spectacles with those of the ordinary type in which no rim is used. While the comfort of the shell-rims is maintained, it is also obvious that the disadvantages of the use of shell-rims, such as the rotation of the lenses within the frames are overcome and still the neatness of appearance is maintained.

While in the foregoing there has been shown and described a preferred embodiment of this invention, it is to be understood that certain minor changes in the details of construction, combination and arrangement of parts may be resorted to, without departing from the spirit and scope of the invention as claimed.

What we claim is:—

A pair of spectacles having an arched nose bridge, reduced tongues at opposite ends of the bridge, said tongues having square outer ends extending in substantially vertical planes, saddle members having flat outer surfaces for engaging the square ends of the nose bridge, parallel arms on the saddle members overlying the tongues of the nose bridge and straps extending from the saddle member in the same planes with the arms and lenses supported by the straps in proper position in the saddle member.

Signed at N. Y. city, in the county and State of N. Y., this 19th day of Sept., 1919.

JULIUS SILVERSTEIN.
JACOB B. ROTHBERG.